Feb. 3, 1970
G. SILVERT
3,493,128
DEVICE FOR THE STORAGE, HANDLING AND TRANSPORTATION OF FRAGILE PLATES
Filed Aug. 1, 1968
2 Sheets-Sheet 1
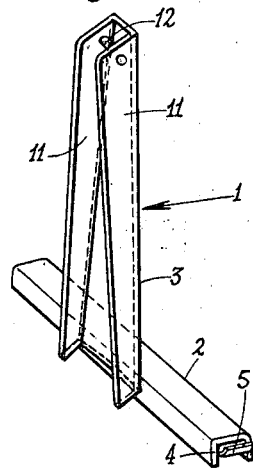
Fig.1
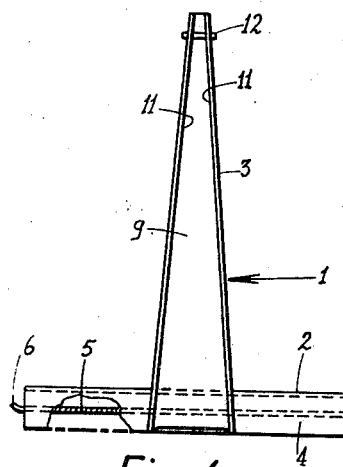
Fig.2
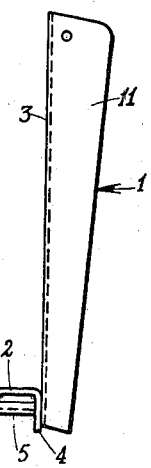
Fig.3
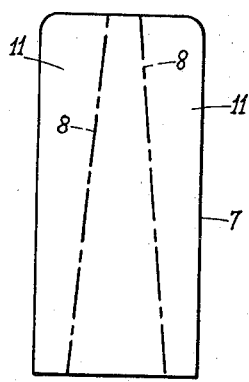
Fig.5
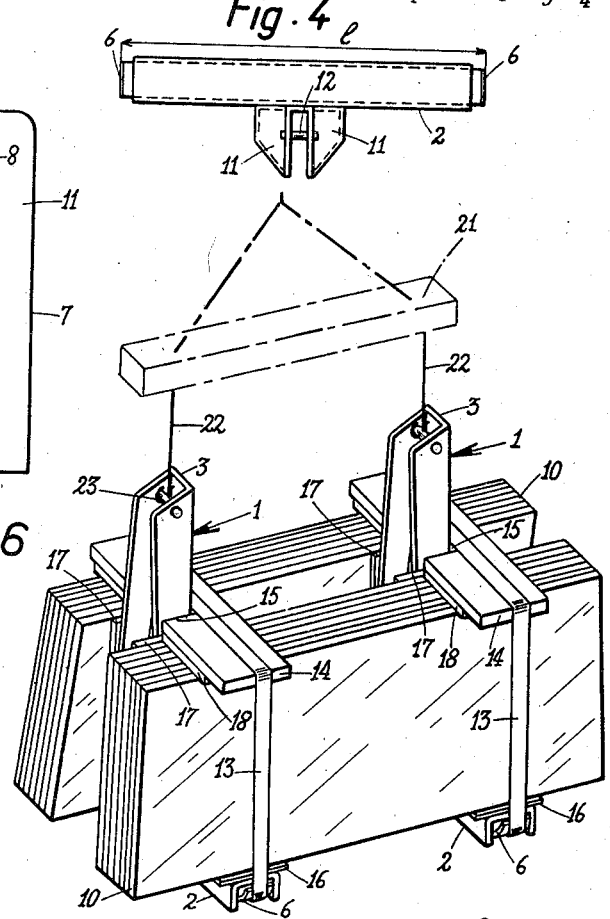
Fig.4
Fig.6
INVENTOR
GERARD SILVERT
By Young + Thompson
ATTYS.

Feb. 3, 1970
G. SILVERT
3,493,128
DEVICE FOR THE STORAGE, HANDLING AND TRANSPORTATION OF FRAGILE PLATES
Filed Aug. 1, 1968
2 Sheets-Sheet 2
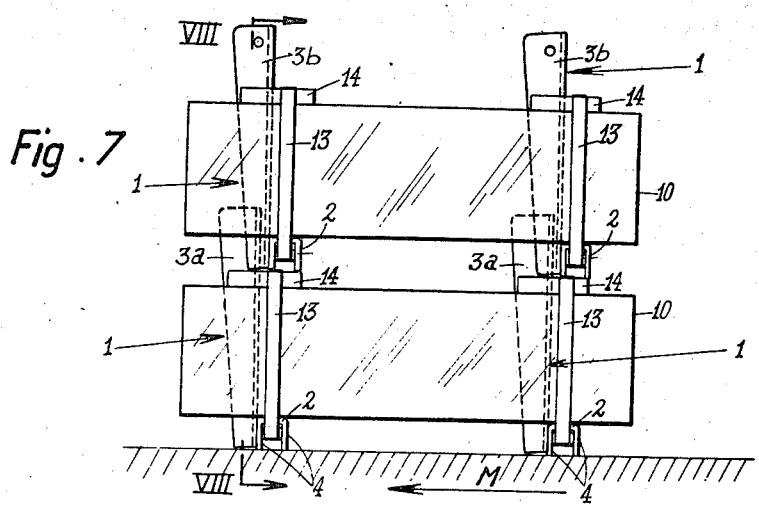
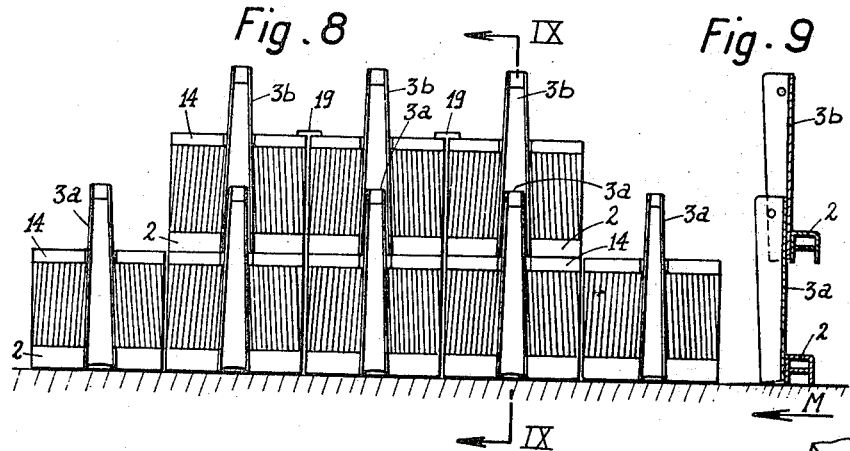
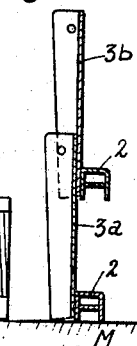
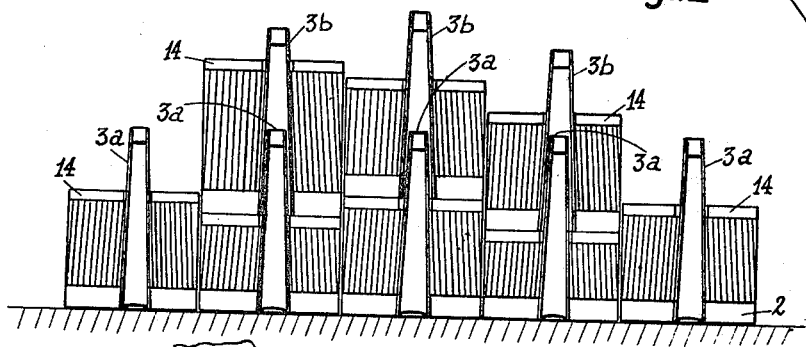
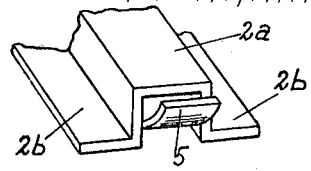
INVENTOR
GERARD SILVERT
By Young & Thompson
ATTYS.

United States Patent Office 3,493,128
Patented Feb. 3, 1970

3,493,128
DEVICE FOR THE STORAGE, HANDLING AND TRANSPORTATION OF FRAGILE PLATES
Gérard Silvert, Hautmont, Nord, France, assignor to Boussois Souchon Neuvesel, Paris, France, a company
Filed Aug. 1, 1968, Ser. No. 749,424
Claims priority, application France, Sept. 8, 1967, 120,382
Int. Cl. B65g 1/14
U.S. Cl. 214—10.5                    6 Claims

ABSTRACT OF THE DISCLOSURE

A device for the storage, handling and transportation of fragile plates and constituted by a T-frame which can be associated with a similar T-frame disposed in parallel relation therewith, both T-frames being placed in inverted position and intended to receive two separate stacks of plates placed on the T-frame base members so that said stacks bear on each side of the T-frame upright members. The height of each upright member is greater than the designed height of the stacks of plates which are applied against said upright member. Preferably the base member of the T-frame is constituted by a structural section and one face of said section is secured to the lower end of the upright member.

---

This invention relates to a device for the storage, handling and transportation of fragile plates such as plate glass, glass sheets, window glass or plates of marble and the like.

It is known to make use of wooden T-frames in order to form packages for plates of fragile materials and especially glass plates. T-frames of this type are made up of two boards which form the base and between which is bonded an upright member having the shape of an isosceles trapezium which progressively tapers towards its free end.

By means of at least two T-frames which are placed in inverted position and disposed in parallel relation, packing of plates is carried out by placing the plates on the bases of the T-frames so that they bear on each side of the upright members. There are thus formed two distinct stacks which are separated by said upright members and these latter are completely embedded between said stacks. Each T-frame is made fast with both stacks by means of a hooping strap which is applied against the outer face of the base member of the T-frame and against a clamping batten which is placed at the top of the assembly and directly above the T-frame. The package which is thus formed is rugged and of high strength, but is nevertheless subject to disadvantages. In point of fact, a special lifting beam is required in order to handle an assembly; rectangular supports suspended from ropes must be lowered horizontally into the empty space between the two stacks and then rotated through an angle of 90° so as to be placed in the lifting position beneath the package. This operation is necessarily time-consuming and must in addition be carried out with care in order not to damage the plates. Furthermore, the loading of packages of this type on transportation vehicles entails the use of wedging and steadying materials in correspondingly larger quantities as the tiering is more extensive; this need of wedging in position is costly, both in raw materials and in labor.

The aim of the present invention is to overcome these various disadvantages and limitations.

In accordance with the invention, the device for storage, handling and transportation of fragile plates and constituted by a T-frame which can be associated with a similar T-frame disposed in parallel relation therewith, both T-frames being placed in inverted position and intended to receive two separate stacks of plates placed on the T-frame base members so that said stacks bear on each side of the T-frame upright members is characterized in that the height of each upright member is greater than the designed height of the stacks of plates which are applied against said upright member.

The upwardly projecting arrangement of the upright members advantageously permits the attachment of a cross-pin to the projecting portion of each upright member for the rapid handling of unit-loads. To this end, the upright members are adapted to project to an appreciable extent above the clamping battens.

The T-frames are preferably metallic and constituted by an assembly of two structural-section base members and upright members formed of bent sheet metal. The upright members are preferably provided with a trapezoidal shape having a hollow cross-section which tapers from the base to the summit, with the result that said upright members can be fitted one inside the other. In a preferred manner, the base members are each constituted by a channel section or U-section which is adapted to rest on the bearing surfaces by means of flanges of small thickness. Thus, if the bases of the flanges penetrate to a slight extent into the bearing surfaces under the weight of the load, the deformation of said surfaces provides the base members under consideration with a self-locking action which consequently has the effect of maintaining the load in position. However, in accordance with another form of construction which is of interest when it is desired to prevent penetration of the T-frame base members into the bearing surfaces and to permit limited sliding of unit-loads, said T-frame base members can be constituted by steel structural shapes having either a square cross-section or an inverted U cross-section with outwardly-bent flanges.

Further properties of the invention will become apparent from the description which now follows below, reference being made to the accompanying drawings which are given by way of example without any implied limitation, and in which:

FIG. 1 is a perspective view of a device according to the invention, said device being assumed to be separate;

FIG. 2 is a front elevation view of said device;

FIG. 3 is a corresponding profile view looking on the left-hand side of the device;

FIG. 4 is a plan view of the device;

FIG. 5 shows the metallic sheet from which the upright member of the device is fabricated, prior to bending;

FIG. 6 is a perspective view of a unit-load of glass plates which is made up by means of the device illustrated in FIG. 1;

FIG. 7 is a longitudinal view of two tiers of unit-loads of the type shown in FIG. 6, said unit-loads having the same dimensions and supported by T-frames, said T-frames being spaced at equal distances and arranged in tiers one on top of the other;

FIG. 8 is a corresponding sectional view taken along line VIII—VIII of FIG. 7;

FIG. 9 shows two devices according to the invention and of the same type as in FIG. 6, said devices being fitted one inside the other as shown along the line IX—IX of FIG. 8, it being assumed that the stacks of plates have been removed;

FIG. 10 shows in cross-section tiered unit-loads having different heights and of the type shown in FIG. 6;

FIGS. 11 and 12 are partial views in perspective showing two alternative forms of construction.

The device in accordance with the invention which is illustrated in FIGS. 1 to 4 has the shape of an inverted T-frame 1 comprising a base member 2 to which is welded an upright member 3. The T-frame 1 is essentially of metallic construction.

The base member 2 is made up of a U-section or channel section, the flanges 4 of which are applied against the supporting surface. The base member 2 is provided internally with a welded metallic strip 5 having a length $l$ and placed parallel to the web of the channel section. Each extremity 6 of said strip projects to a small distance from the end of the channel section and is curved upwards in the direction of the web of said section. It will be understood that said strip 5 contributes to the rigidity of the base member 2 and serves as a support for a hooping strap.

The upright member 3 is fabricated from a rectangular metal sheet 7 with two rounded corners, as shown in FIG. 5; said sheet is bent at right angles along the convergent folding lines 8. As thus constructed, the upright member 3 has the shape of a structural section comprising a web 9 having a trapezoidal contour and convergent flanges 11 which are formed by the folded-back edges of the rectangular sheet 7. At the lower end which has the greatest width, the web 9 of the upright member 3 is welded to the central portion of one of the flanges 4 of the base member 2. A cross-pin 12 which is welded to the flanges 11 at the upper extremity of the upright member constitutes a handling means.

By virtue of the hollow structural shape of decreasing width which is adopted for the upright member 3, the upright members 3 of the T-frames 1 can be readily fitted one inside the other. Furthermore, the length of the upright member 3 is chosen so that it can project to a substantial distance above the unit-loads which are made up by means of the device according to the invention.

Reference will now be made to FIG. 6 which shows a structure in accordance with the invention and a unit-load of glass plates 10. Said glass plates are divided into two separate stacks placed edgewise on the base members 2 of two parallel T-frames 1 and applied against the upright members 3 of said T-frames 1. The unit-load is hooped by means of two metallic straps 13 applied at the bottom portions thereof against the metallic strips 5 which are fitted inside the base members 2 of the T-frames 1 and at the top portions thereof against clamping battens 14. The clamping battens are usually made of wood, have a length which is substantially equal to the length $l$ of the metallic strips 5 and are provided with a recess 15 for the insertion of the upright members 3 of the T-frames 1 when said battens are placed directly above the base members 2 of the T-frames 1. Moreover, protective packing-pieces are placed between the glass sheets 10 and the members against which they are applied. To this end, the base member 2 of the T-frames 1 are covered with a paperboard strip 16 of substantial thickness and relatively rigid while the upright members 3 are covered with a paperboard strip 17 of smaller thickness and greater flexibility; similarly, strips of expanded polystyrene 18 are placed beneath the clamping battens 14. When made up in this manner, the unit-load has a rectangular cross-section at the level of the hooping straps 13 and the upright members 3 of the frame members 1 project freely above the stacks.

It will be understood that, in order to make up the above-mentioned unit-load of glass plates by means of the device according to the invention, it is merely necessary to place two identical T-frames 1 in parallel relation so that the base members 2 rest on the ground at the required distance from each other and then to stack the glass sheets 10 after first placing the packing-pieces 16 and 17 in position.

It will be noted in the first place that the structure has remarkable strength characteristics by virtue of the trapezoidal structure of the upright member 3, the flanges 11 of which are of greater depth at the top in order to increase the torsional strength and bending strength of said upright member.

In the form of construction which has just been described, the device according to the invention has a further remarkable advantage in that it improves the handling of unit-loads in which it is incorporated. Rapid and reliable handling is thereby permitted and is carried out by means of an ordinary lifting beam 21 fitted with two cables 22 from which are suspended hooks 23 which are adapted to engage respectively in the cross-pins 12 of the upright members 3.

By means of this device, stacking is remarkably convenient and makes it possible to form homogenous stacked loads. With reference to FIGS. 7, 8 and 9 in which are shown loads having the same height and formed by means of equally-spaced T-frames 1, it is apparent that the upright members 3b of the T-frames 1 of the upper unit-loads are engaged within the upright members 3a of the lower unit-loads and rest on the clamping battens 14 of these latter. In the vertical plane, the tiering operation is carried out with complete safety while producing a uniform alignment of unit-loads in horizontal layers. If, as shown in FIG. 10, the unit-loads which are supported by equally-spaced T-frames 1 have different heights, tiering is performed in the same manner as before but without alignment in parallel horizontal tiers.

Finally, a noteworthy technical effect of the constructional arrangement according to the invention as hereinabove described consists in the self-locking action which dispenses with any need to wedge loads in position on the floors of transportation vehicles. Referring again to FIGS. 7, 8, 9 and 10, it will be apparent that interlocking of equally spaced loaded T-frames 1 is carried out as follows:

In the transverse direction and in the case of a load which is made up of unit stacks having the same height (as shown in FIG. 8), the clamping battens 14 are all located at the same height; said battens are thus applied against each other and the unit-load is permitted to form a nondeformable volume. As a precautionary measure, two adjacent unit-loads can be joined together by means of staples 19 which are nailed onto the clamping battens. In the case of a load consisting of unit stacks of different heights as shown in FIG. 10, the clamping battens 14 are no longer applied against each other; transverse clamping is in that case carried out by means of hooping straps 13 which may be reinforced if so required.

In the longitudinal direction, that is to say in the direction of the greatest length of the unit-loads when these latter are not tiered, longitudinal clamping is carried out automatically by means of the flanges 4 of the T-frame base-members 2 inasmuch as said flanges tend to deform or to punch the surfaces against which they are applied by virtue of their small thickness of the order of a few millimeters. In the case of tiered unit-loads as shown in FIG. 7, a clamping action is obtained by virtue of the relative arrangement of the upright members 3a and 3b of the T-frames 1 on which the unit-loads are placed one above the other by reason of the shape of the upright members which are permitted to fit one inside the other and also by virtue of the punching action which is produced by the base members 2 of the T-frames 1 of the upper unit-loads on the clamping battens 14 of the lower unit-loads.

In a preferred manner which is shown in FIGS. 7 and 9, the vehicle which is employed for transportation being shown as traveling in the direction of the arrow M, the upright members 3b of the T-frames 1 of the tiered unit-loads are engaged in the upright members 3a of the T-frames of the lower unit-loads and to the rear of these latter; in the event of sudden braking of the vehicle, the upright members 3b of the upper unit-loads tend to be applied against the upright members 3a of the lower unit-loads. By virtue of this arrangement, longitudinal clamping of the upper unit-loads is thus enhanced and is not affected by sudden deceleration of the vehicle.

In a practical assembly consisting of a unit-load of glass plates 10 having a width of 68 centimeters, use was made of T-frames 1 in which the width of each base member 2 was 45 centimeters and the useful height of each upright member 3 was 82 centimeters. Each base member 2 of the T-frames 1 was covered with a single strip 16 of thick pasteboard 45 cm. x 10 cm. and having a thickness of 1 centimeter, the pasteboard being cut into shape in order to be fitted around the upright members 3. Paperboard strips 17 were placed against each flange 11 of the upright members 3, the dimensions of said strips being 68 cm. x 10 cm. and 3 millimeters in thickness. Finally, wooden clamping battens 14 measuring 45 cm. x 10 cm. and having a thickness of 4 centimeters were placed over the stacks after interposition of a flexible strip of expanded polystyrene 18 having a thickness of 0.5 cm. After hooping, the upright members of the T-frames projected to a distance of approximately 9 centimeters above the clamping battens 14.

In some types of loads which are not tiered, especially in the case of railroad transportation, it can prove necessary to permit unit-loads to slide on the platform in the event of rapid deceleration. In this case, the base of the structural section or base member is provided with bearing surfaces of sufficient width to prevent any punching action of the device on the transportation platform.

Thus, in the embodiment of FIG. 11, the base member 2a has an inverted U-section with outwardly-bent flanges 2b. Said base member is provided internally with a metallic strip 5 which has the same function as in the previous embodiment.

In the embodiment of FIG. 12, the base member 2c is a closed structural member with a square cross-section. This structural member is provided with internally-chamfered ends 19 which serve to prevent any sharp bending of the hooping strap which is passed inside the structural member and is applied against the internal top face of this latter.

It is readily apparent that the invention is not limited to the form of construction which has just been described and that many alternative forms may be contemplated without thereby departing from the scope of the invention. In particular, when the fragile plates are of substantial length, it would be wholly feasible to associate more than two T-frames of similar design in order to make up unit-loads. Moreover, the hook-engagement means which are contemplated at the top of the upright member 3 can be modified according to requirements.

I claim:

1. A device for the storage, handling and transportation of fragile plates and constituted by a T-frame having a base member and an upright member fixed thereon and transversely thereto, said T-frame being in use associated with a similar T-frame disposed in parallel relation therewith, both T-frames being placed in inverted position and intended to receive two separate stacks of plates placed on said T-frame base members so that said stacks bear on each side of said T-frame upright members, the height of each upright member being greater than the designed height of the stacks of plates applied thereagainst, said upright member having a U-shaped cross section comprising two oppositely facing flanges and a web of trapezoidal configuration which progressively tapers from the base to the summit, said upright member having at the top portion thereof a cross pin which passes through said two oppositely facing flanges.

2. A device for the storage, handling and transportation of fragile plates and constituted by a T-frame having a base member and an upright member fixed thereon and transversely thereto, said T-frame being in use associated with a similar T-frame disposed in parallel relation therewith, both T-frames being placed in inverted position and intended to receive two separate stacks of plates placed on said T-frame base members so that said stacks bear on each side of said T-frame upright members, the height of each upright member being greater than the designed height of the stacks of plates applied thereagainst, the base member of the T-frame being constituted by a structural section, one face of said section being secured to the lower end of said upright member, said T-frame base member comprising means for guiding a strap which serves to loop the stack of plates carried by the T-frame.

3. A device for the storage, handling and transportation of fragile plates and constituted by a T-frame having a base member and an upright member fixed thereon and transversely thereto, said T-frame being in use associated with a similar T-frame disposed in parallel relation therewith, both T-frames being placed in inverted position and intended to receive two separate stacks of plates placed on said T-frame base members so that said stacks bear on each side of said T-frame upright members, the height of each upright member being greater than the designed height of the stacks of plates applied thereagainst, the base member of the T-frame being constituted by a structural section, one face of said section being secured to the lower end of said upright member, said T-frame base member having a cross section in the shape of an inverted U, and comprising two flanges, the edges of said flanges being intended to come into contact with bearing surfaces.

4. A device in accordance with claim 3, characterized in that the flanges of the structural section are bent outwards.

5. A device for the storage, handling and transportation of fragile plates and constituted by a T-frame having a base member and an upright member fixed thereon and transversely thereto, said T-frame being in use associated with a similar T-frame disposed in parallel relation therewith, both T-frames being placed in inverted position and intended to receive two separate stacks of plates placed on said T-frame base members so that said stacks bear on each side of said T-frame upright members, the height of each upright member being greater than the designed height of the stacks of plates applied thereagainst, clamping battens for securing the plates and each having a recessed portion so as to permit the engagement thereof over the projecting portions of the upright members, said battens being disposed transversely of the two stacks, and hooping straps which are engaged respectively in the base members of the T-frames and that retain the clamping battens.

6. A device in accordance with claim 5, characterized in that protective packing pieces are interposed between the plates on the one hand and the T-frames and clamping battens on the other hand.

References Cited

UNITED STATES PATENTS

| D. 191,811 | 11/1961 | Levinson | 211—126 XR |
|---|---|---|---|
| 2,116,381 | 5/1938 | Burke. | |
| 2,305,405 | 12/1942 | Burrell | 214—10.5 |
| 3,085,697 | 4/1963 | Walters. | |

FOREIGN PATENTS 847,704   9/1960   Great Britain.

ROBERT G. SHERIDAN, Primary Examiner

FRANK E. WERNER, Assistant Examiner

U.S. Cl. X.R.

108—53; 294—67